June 19, 1923.
A. H. HILKER
WOODWORKING TOOL
Filed June 5, 1922
1,459,534
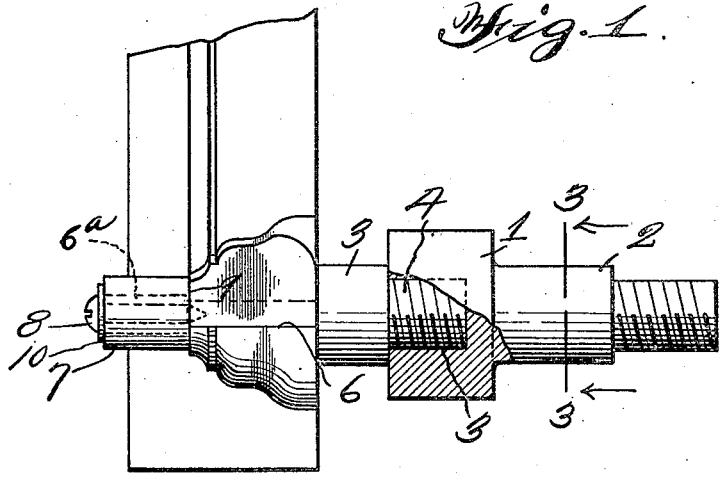
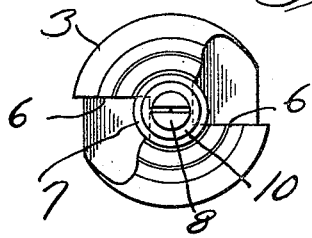
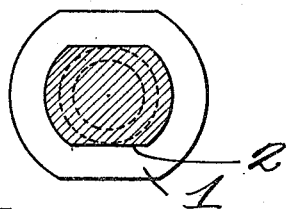
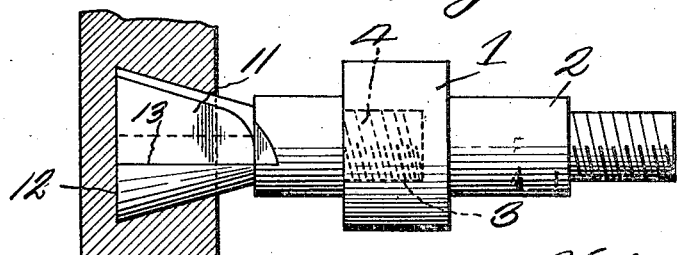
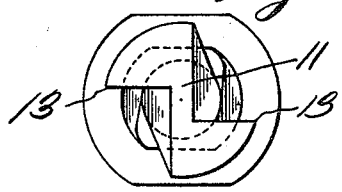
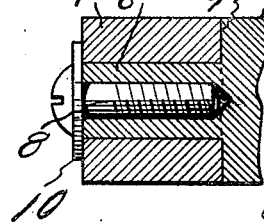
Inventor
A. H. Hilker
D. Swift
Attorney Patented June 19, 1923.

1,459,534

UNITED STATES PATENT OFFICE.

ANTHONY H. HILKER, OF FORT WAYNE, INDIANA.

WOODWORKING TOOL.

Application filed June 5, 1922. Serial No. 565,834.

*To all whom it may concern:*

Be it known that I, ANTHONY H. HILKER, a citizen of the United States, residing at Fort Wayne, in the county of Allen, State of Indiana, have invented a new and useful Woodworking Tool; and I do hereby declare the following to be a full, clear, and exact description of the invention, such as will enable others skilled in the art to which it appertains to make and use the same.

The invention relates to wood working tools and has for its object to provide a device of this character wherein moldings may be formed of various cross sectional contours by rotating cutters, the lower ends of said cutters being provided with extensions having guide rollers for engaging the side of the molding or other article being formed and forming means for guiding the material or the tool as well as forming means for limiting the cutting action of the rotating tool.

A further object is to provide a frusto-conically shaped cutter whereby mortises may be formed.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a side elevation of the tool for forming moldings and the like, showing the same in position on a piece of molding.

Figure 2 is an end view of the molding cutter.

Figure 3 is a sectional view through the tool holder taken on line 3—3 of Figure 1.

Figure 4 is an enlarged detail sectional view through the end of the molding cutter and the guide roller carried thereby.

Figure 5 is a side elevation of the mortise cutting tool.

Figure 6 is an end view of the mortise cutting tool.

Referring to the drawing the numeral 1 designates a tool holder, which tool holder is provided with a flattened shank 2 for the reception of a wrench. The molding cutter 3 has its shank reduced and threaded at 4, so that the same may be threaded into the threaded aperture 5 in the tool holder. The molding cutter may have its cutting edges 6 formed of various contours according to the form of molding device, however it is provided with an axially extending sleeve $6^a$ on which is rotatably mounted a guide wheel 7. The guide wheel 7 during the formation of the molding or other article engages the material as shown in Figure 1 and guides the tool or material being moved in engagement therewith in such a manner that the cutting edges 6 will be limited in the depth of cut, thereby insuring the formation of a molding of uniform cross sectional contour. Threaded into the sleeve $6^a$ is a screw 8, the guide roller 7 being interposed between the shoulder 9 of the cutter and a washer 10 carried by said screw. Therefore it will be seen that the guide roller will be held on the sleeve $6^a$, and that the guide roller may be easily removed when it is desired to place a larger roller thereon.

Referring to Figures 5 and 6 it will be seen that the frusto conically shaped cutter 11 when rotated will form a mortise 12 by the cutting away of material by the cutting edges 13.

From the above it will be seen that a molding forming tool is provided which is positively guided in its operation by the roller 7, and not only moldings may be formed but other articles formed as desired.

The invention having been set forth what is claimed as new and useful is:

The combination with a rotary molding cutter, of guide means carried by said cutter, said guide means comprising a work engaging roller, said roller being rotatably mounted on an integral axial sleeve carried by the outer end of the cutter, a washer engaging the outer end of the roller and the sleeve and a screw extending through said washer and threaded into the sleeve.

In testimony whereof I have signed my name to this specification in the presence of two subscribing witnesses.

ANTHONY H. HILKER.

Witnesses:
CLINTON R. WILLSON,
T. R. LAUER.